Patented Jan. 12, 1932

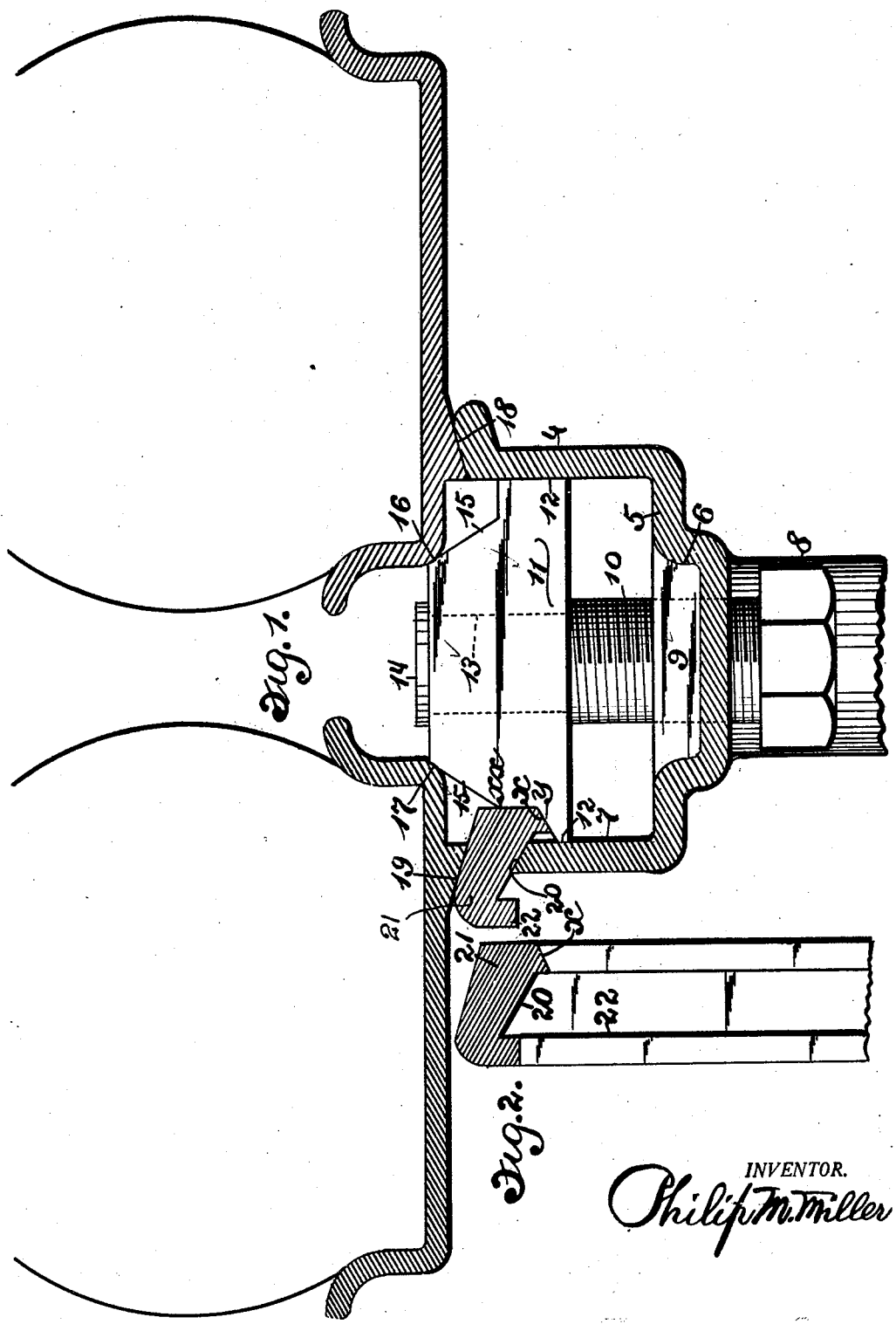

1,840,678

UNITED STATES PATENT OFFICE

PHILIP M. MILLER, OF YOUNGSTOWN, OHIO, ASSIGNOR TO MILLER DEVICES INC., OF NEW YORK, N. Y., A CORPORATION OF NEW YORK

MOTOR WHEEL AND RIM CONSTRUCTION

Application filed December 5, 1928. Serial No. 323,811.

This invention relates to tire-carrying rim constructions each provided with a single beveled bearing formed on the base thereof, the rim constructions being interchangeable one for the other on the front wheel and rear wheel of a motor driven vehicle, and the rim constructions being employed on a specially constructed wheel periphery by means of the employment of operative members forming parts thereof.

The particular object of the invention is the provision of the wheel and rim constructions and means of operating the rims on the wheel construction as an improvement to the constructions described in the specifications Serial Nos. 642,144 and 251,980, filed May 28, 1923, and Feb. 4, 1928, respectively.

Other objects and advantages of the invention will be appreciated from the description of the accompanying drawings.

A desirable form in which my invention may be embodied is illustrated in the accompanying drawings, wherein Fig. 1 is a cross section of the improved wheel and rim construction embodying the features of my invention; while Fig. 2 is a cross section of a sectioned member employed in connection with the construction shown in Fig. 1, the sectioned member being an annular ring member split at one point to provide resiliency for operation of the device.

The wheel construction is provided with a felly 3 formed with an upright wall 4 merged with a transverse base 5 having an intermediate channel 6 which is merged with another upright wall 7. The channel 3 may be formed in any preferable manner and fastened to a spider structure in any suitable manner to provide a complete wheel construction, such as, for instance, by rolling the felly and providing it with a channel seat 6 which is connected with the spider spokes 8 and having thereupon a plurality of members 9 each fixed at a point between two spokes so spaced as to provide a channel space between two adjacent members 9. Each member 9 is of sufficient thickness that it affords a substantial body together with the body of the channel 6 for the formation of a threaded opening through the middle portion thereof, which will firmly engage with and support the member 10 in operative position in relation with the member 11 and the walls 4 and 7 of the channel 3. As shown, member 10 is threaded through the threaded opening in the wall or body of the channel 6 and body of member 9 in a radial position to be aligned in parallel with the walls 4 and 7 of the felly 3, and its radially outer end is provided with a round non-threaded shank which passes through the non-threaded opening in member 11, as shown at 13, and the head thereof is riveted to provide a pivotal connection as shown at 14.

Each member 11 is provided with opposite straight walls 12 and tapered faces 15 adapted to contact with the rims at the points 16 and 17 as shown. Adjacent with the tapered portion 15 of one side of each member 11 is formed an extended bevelled surface Y throughout its length for the engagement, as hereinafter described, of the portion X of split ring member 21, as shown.

As shown in Fig. 2, member 21 comprises an annular ring split at one point to provide resiliency, provided with a tapered surface 19 formed on the periphery thereof, a tapered face 20 formed on the inner circumferential edge and opposite walls 22 and X each merged with the body of member 21. As is obvious the side portion 22 is extended radially inwardly on a straight line having a straight face, while the opposite side portion X is formed with a tapered face for the purpose of wedging engagement with the bevelled surface Y, and the face 20 extends on an incline from the wall of the portion X to the inner face of the portion 22, so as to provide, in connection with the tapered face on the periphery of the member 21, a wedge-shaped body adapted for operation in connection with holding and permitting to release the demountable rim on the channel periphery of the wheel.

The wall 7 of the felly 3 is provided with the tapered edge, as shown, for the purpose of slidably securing the ring member 21 thereon, and the side walls 22 and X, as shown, are adapted to serve as checking means against accidental displacement of the ring member from the channel periphery 3. By means of the ring member being split, the same is capable of becoming contracted and expanded in response to manipulation for mounting and demounting of the rims on the wheel.

For the purpose of thorough understanding of the proper method of mounting, locking, unlocking and demounting the rim constructions on the wheel, the description thereof follows: Before the rims are mounted on the wheel, all threaded members 10 with the pivoted wedge members 11 are moved radially, inwardly so that the radially inner face of each member 11 is in contact with the face of each fixed member 9. The split resilient ring member 21 is slidably moved laterally, angularly on the tapered face of the wall 7 of the channel periphery 3 so that the laterally inner face of portion 22 is in engagement with the outboard face of the wall 7 and the portion X is on a line at a remote distance from the wall 7. As a result of removing the split member 21 from its former position sufficient clearance is provided for the rims to pass for their locking on the felly 3. The inboard rim is moved to a position on the felly 3 with its tapered bead in contact with the tapered flange 18 of the wall 4 thereof, having the greater portion of the cross sectional body of the rim hanged over beyond the wall 4 of the felly 3. The outboard rim is then placed in position with its felly engaging flange in adjacency to the felly engaging flange of the inboard rim. When the rims are so arranged the members 10 are each alternately moved radially outward and each pivoted wedge member 11 is thereby engaged with the sides 4 and 7 of the felly 3, as shown at 12. When the members 10 are sufficiently moved outwardly the pivoted members 11 are each engaged with the rims having the tapered portions 15 thereof in wedging engagement with the corners of the rims as shown at 16 and 17, and the bevelled portion Y in wedging engagement with the tapered portion X of member 21 thereby moving and securing the member 21 into wedging engagement between the bead 19 of the outboard rim and tapered surface of the wall 7 of the felly 3.

With the foregoing general description of the principles of the invention, it is understood that the latter is susceptible to wide range of modification, variation and substitution without departing from the salient features and underlying principles thereof.

Having thus described my invention, what I desire to secure by Letters Patent is:

1. In a dual rim structure, a pair of rims each having a single seating surface, a channel felly having oppositely tapered seats on the side walls; a split wedge ring mounted on the tapered seat on the outboard wall of said felly adapted for lateral angular sliding motion thereon; radially operative bolts threaded into the base of said felly; and wedge members to force the rims laterally and outwardly in respect to each other, said wedge members being pivotally carried by said bolts and having one wedge surface engaging with one side of the inboard rim, another wedge surface engaging with one side of the outboard rim and a third wedge surface engaging the circumferential inner edge portion of said split wedge ring.

2. In a dual rim structure, a pair of demountable rims each having a single seating surface, a channel felly having oppositely tapered seats on the side walls, the outboard side wall being shorter than the inboard side wall; a split wedge ring having a tapered inwardly projecting portion mounted on the tapered seat on the outboard wall of said felly adapted for lateral angular sliding motion thereon; the said felly base being spacedly thickened radially operative members threaded into the thickened base of said felly; and wedge members to force the rims laterally and outwardly into engagement with said inner tapered seat and the tapered face of said split wedge ring, said wedge members being pivotally carried by said bolts and having one wedge surface engaging with one side of the inboard rim, another wedge surface engaging with one side of the outboard rim and a third wedge surface engaging the tapered portion of the circumferential inner edge portion of said split wedge ring.

3. In a dual rim structure, a pair of demountable rims each having a single seating surface, a channel felly having side seats on the walls thereof, a split wedge ring having an inwardly projecting portion mounted on the side seat on the outboard wall of said felly adapted for lateral sliding motion thereon; the base of said felly being provided with raised threaded portions; radially operative rotatable members threaded into said raised threaded portions; and wedge members pivotally carried by said rotatable members and having wedge surfaces for engagement with one side of each rim and the inwardly projecting portion of the split wedge ring; said wedge members by their radial outward movement operating to move one of the rims into wedging engagement with the seat on the inboard wall of the felly and the other of said rims into wedging engagement with the face on the said split wedge ring and to laterally move said split ring on the seat on the outboard wall of said felly, thereby locking the rims in relation with said felly.

PHILIP M. MILLER.